United States Patent
Hofmann et al.

(10) Patent No.: US 7,822,903 B2
(45) Date of Patent: Oct. 26, 2010

(54) SINGLE BUS COMMAND HAVING TRANSFER INFORMATION FOR TRANSFERRING DATA IN A PROCESSING SYSTEM

(75) Inventors: Richard Gerard Hofmann, Cary, NC (US); Terence J. Lohman, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 612 days.

(21) Appl. No.: 11/557,119

(22) Filed: Nov. 7, 2006

(65) Prior Publication Data
US 2007/0204091 A1    Aug. 30, 2007

Related U.S. Application Data

(60) Provisional application No. 60/776,516, filed on Feb. 24, 2006.

(51) Int. Cl.
*G06F 13/36* (2006.01)
(52) U.S. Cl. .......................... 710/308; 710/110; 710/37
(58) Field of Classification Search ......... 710/240–244, 710/7–9, 20–22, 26–27, 31–35, 308–311
See application file for complete search history.

(56) References Cited

U.S. PATENT DOCUMENTS

| | | | | |
|---|---|---|---|---|
| 5,826,101 A * | 10/1998 | Beck et al. | ..................... | 712/34 |
| 5,898,891 A * | 4/1999 | Meyer | .......................... | 710/33 |
| 6,049,841 A * | 4/2000 | Fields et al. | .................. | 710/28 |
| 6,145,027 A * | 11/2000 | Seshan et al. | ................. | 710/22 |
| 6,230,219 B1 * | 5/2001 | Fields et al. | .................. | 710/22 |
| 6,738,845 B1 * | 5/2004 | Hadwiger et al. | ........... | 710/240 |
| 6,883,041 B2 * | 4/2005 | Fukawa et al. | ................ | 710/22 |
| 7,209,998 B2 * | 4/2007 | Hofmann et al. | ............ | 710/305 |
| 7,293,120 B2 * | 11/2007 | Giebel | ......................... | 710/22 |
| 7,373,437 B2 * | 5/2008 | Seigneret et al. | .............. | 710/22 |
| 7,389,365 B2 * | 6/2008 | Gray et al. | ..................... | 710/22 |
| 7,523,228 B2 * | 4/2009 | Biran et al. | .................... | 710/22 |
| 2002/0099880 A1 * | 7/2002 | Martin et al. | ................. | 710/22 |

* cited by examiner

*Primary Examiner*—Raymond N Phan
(74) *Attorney, Agent, or Firm*—Peter M. Kamarchik; Nicholas J. Pauley; Sam Talpalatsky (57) ABSTRACT

A processing system and method for transferring data in a processing system. The processing system includes a bus mastering device, a plurality of slave devices, and a bus interconnect configured to switch the bus mastering device between the slave devices. Each of the slave devices has a plurality of addresses. The bus interconnect includes a DMA controller configured to transfer data from a first one of the addresses to a second one of the addresses in response to a single bus command from the bus mastering device.

30 Claims, 4 Drawing Sheets

SINGLE BUS COMMAND HAVING TRANSFER INFORMATION FOR TRANSFERRING DATA IN A PROCESSING SYSTEM

CLAIM OF PRIORITY UNDER 35 U.S.C. §119

The present Application for Patent claims priority to Provisional Application No. 60/776,516 entitled "Single Request Memory Movement Transactions on a Two Channel Bus" filed Feb. 24, 2006, and assigned to the assignee hereof and hereby expressly incorporated by reference herein.

BACKGROUND

1. Field

The present disclosure relates generally to processing systems, and more specifically, to systems and techniques for transferring data between slave devices in response to a single bus command from a bus mastering device.

2. Background

At the heart of most modem processing systems is a communications structure referred to as a bus. The bus moves information between various processing entities in the system. Today, most on-chip bus architectures are fairly standardized. These standardized bus architectures typically have independent and separate read, write and address channels.

This type of bus architecture is often found in processing systems with one or more general purpose processors supported by memory. In these systems, memory provides a storage medium that holds the programs and data needed by the processors to perform their functions. A processor may read or write to the memory by placing an address on the address channel and sending the appropriate read/write control signal. Depending on the state of the read/write control, the processor either writes to the memory over the write channel or reads from the memory over the read channel.

In some processing systems, there may be a need to transfer data between memory devices. By way of example, a processor may need to transfer data from memory to a transceiver for transmission over a network. This data transfer operation requires a two-step process. First, the processor must read the data from memory. Next, the processor must send the data to the transceiver. Accordingly, there is a need in the art for techniques that allow data to be efficiently transferred between two devices in a processing system without having to pass it through the processor.

SUMMARY

An aspect of a processing system is disclosed. The processing system includes a bus mastering device, a plurality of slave devices, and a bus interconnect. Each of the slave devices has a plurality of addresses. The bus interconnect includes a DMA controller configured to transfer data from a first one of the addresses to a second one of the addresses in response to a single bus command from the bus mastering device.

An aspect of a bus mastering device is disclosed. The bus mastering device includes a processor configured to access a plurality of slave devices through a bus interconnect. Each of the slave devices has a plurality of addresses. The processor being further configured to send a single bus command to the bus interconnect, the bus command being sufficient to enable the bus interconnect to transfer data from a first one of the addresses to a second one of the addresses.

An aspect of a bus interconnect is disclosed. The bus interconnect is configured to support communications between a bus mastering device and a plurality of slave devices, each of the slave devices having a plurality of addresses. The bus interconnect includes a DMA controller configured to transfer data from a first one of the addresses to the second one of the addresses in response to a single bus command from the bus mastering device.

An aspect of a method of transferring data in processing system is disclosed. The processing system includes a bus mastering device and a plurality of slave devices, each of the slave devices having a plurality of addresses. The method includes generating a bus command at the bus mastering device, and transferring data from a first one of the addresses to a second one of the addresses in response to the single bus command generated by the bus mastering device.

Another aspect of a bus mastering device is disclosed. The bus mastering device includes means for accessing a plurality of slave devices through a bus interconnect. Each of the slave devices has a plurality of addresses. The bus mastering device also includes means for sending a single bus command to the bus interconnect, the bus command being sufficient to enable the bus interconnect to transfer data from a first one of the addresses to a second one of the addresses.

Another aspect of a bus interconnect is disclosed. The bus interconnect includes means for switching a bus mastering device between a plurality of slave devices. Each of the slave devices has a plurality of addresses. The bus interconnect also includes means for transferring data from a first one of the addresses to a second one of the slave addresses in response to a single bus command from the bus mastering device.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the invention as claimed. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

In a processing system, a bus provides a means for any number of devices to communicate amongst one another. A bus interconnect is used to provide a direct connection between two devices on the bus while they are communicating. Multiple direct links may be used to allow several devices to communicate with other devices at the same time. In the various embodiments explained throughout this disclosure, the bus interconnect includes Direct Memory Access (DMA) circuitry that allows data movement between two address locations in response to a single bus command from a third party. A "single" bus command means a command transmitted in a single clock cycle with sufficient information to enable to the DMA circuitry to transfer data between two address locations. The bus command includes the source and destination addresses, the payload size, and a DMA data transfer attribute. The DMA data transfer attribute is used to indicate a bus transaction calling for the transfer of data between two devices.

The processing system may be implemented with a two channel bus. The two channel bus includes a transmit channel and a read channel. A "channel" is defined as a set of electrical conductors used to carry information between two devices and which has a set of common control signals. The transmit channel provides the functionality of the address and write channels of the traditional bus architecture. In this example, the transmit channel serves as a generic medium for transmitting addresses and write data from a bus mastering device to a slave device. The read channel serves its traditional function of providing read data from the slave device to the bus mastering device.

Figure 1:
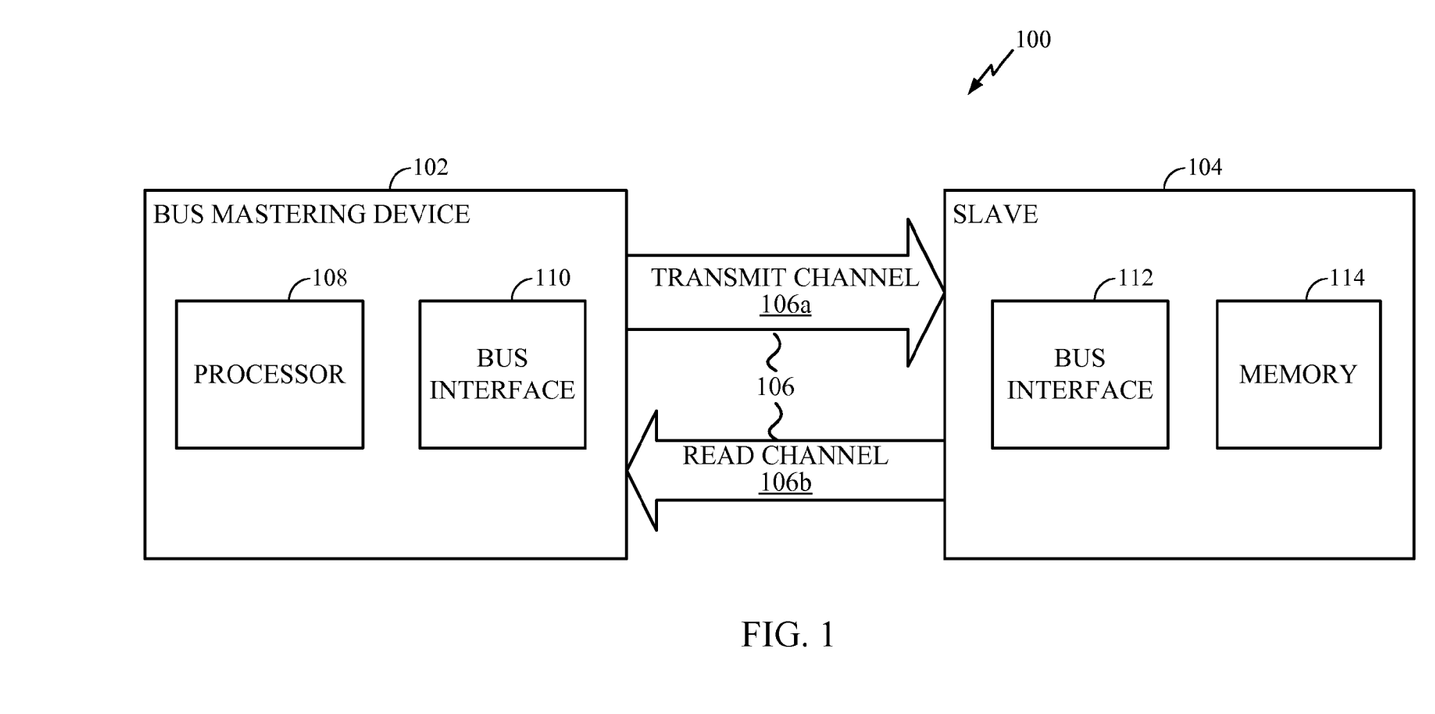
FIG. 1 is a conceptual block diagram illustrating an example of two devices in a processing system communicating over a two channel bus.

An example of a two channel bus will be described with reference to FIG. 1. FIG. 1 is a conceptual block diagram illustrating an example of two devices in a processing system communicating over a two channel bus. The processing system 100 may be a collection of devices that cooperate to perform one or more processing functions. Typical applications for the processing system 100 include, but are not limited to, desktop computers, laptop computers, servers, cellular phones, personal digital assistants (PDA), game consoles, pagers, modems, audio equipment, medical devices, automotive, video equipment, industrial equipment, or any other machine or device capable of processing, retrieving and storing information.

The processing system 100 is shown with a bus mastering device 102 in communication with a slave device 104 over a bus 106. In this example, the bus mastering device 102 includes a processor 108 and a bus interface 110. The processor 108 may be a general purpose processor, such as a microprocessor, a special purpose processor, such as a digital signal processor (DSP), an application specific integrated circuit (ASIC), a direct memory access (DMA) controller, a bridge, a programmable logic component, or any other entity that requires access to the bus 106. The bus interface 110 is used to drive the transmit channel 106a, as well as provide the appropriate control signals. The bus interface 110 also serves as a receiver for the read channel 106b.

The slave device 104 may be any device capable of retrieving and storing information. In this example, the slave device 104 includes a bus interface 112 and memory 114. The bus interface 112 is used to drive the read channel 106b and the appropriate control signals. The bus interface 112 also serves as a receiver for the transmit channel 106a. The memory 114 may be volatile memory, such as SDRAM, DRAM, or RAM, or non-volatile memory such as flash memory, ROM memory, EPROM memory, EEPROM memory, CD-ROM, DVD, magnetic disk, rewritable optic disk, or any other device whose contents can be accessed (i.e., read and written to) randomly.

In this bus architecture, the bus mastering device 102 may read or write to the slave device 104. When the bus mastering device 102 performs a write operation, it sends the address and write data to the slave device 104 on the transmit channel 106a and asserts a write enable signal. When the bus mastering device 102 performs a read operation, it sends the address to the slave device 104 on the transmit channel 106a and deasserts the write enable signal. In response, the slave device 104 sends read data to the bus mastering device 102 on the read channel 106b.

The two channel bus 106 may be configured to facilitate multiple bus transaction requests during a single clock cycle. An example of this concept will be described with reference to FIG. 2. In this example, the transmit and read channels 106a, 106b are each 64-bits wide. The addresses presented to the slave device 104 are 32-bits wide. This allows the bus mastering device 102 to provide two addresses on the transmit channel 106a during the same clock cycle. The bus mastering device 102 may send one 32-bit address on the four lower-order byte lanes of the transmit channel 106a and another 32-bit address on the four higher-order byte lanes of the transmit channel 106a.

Figure 2:
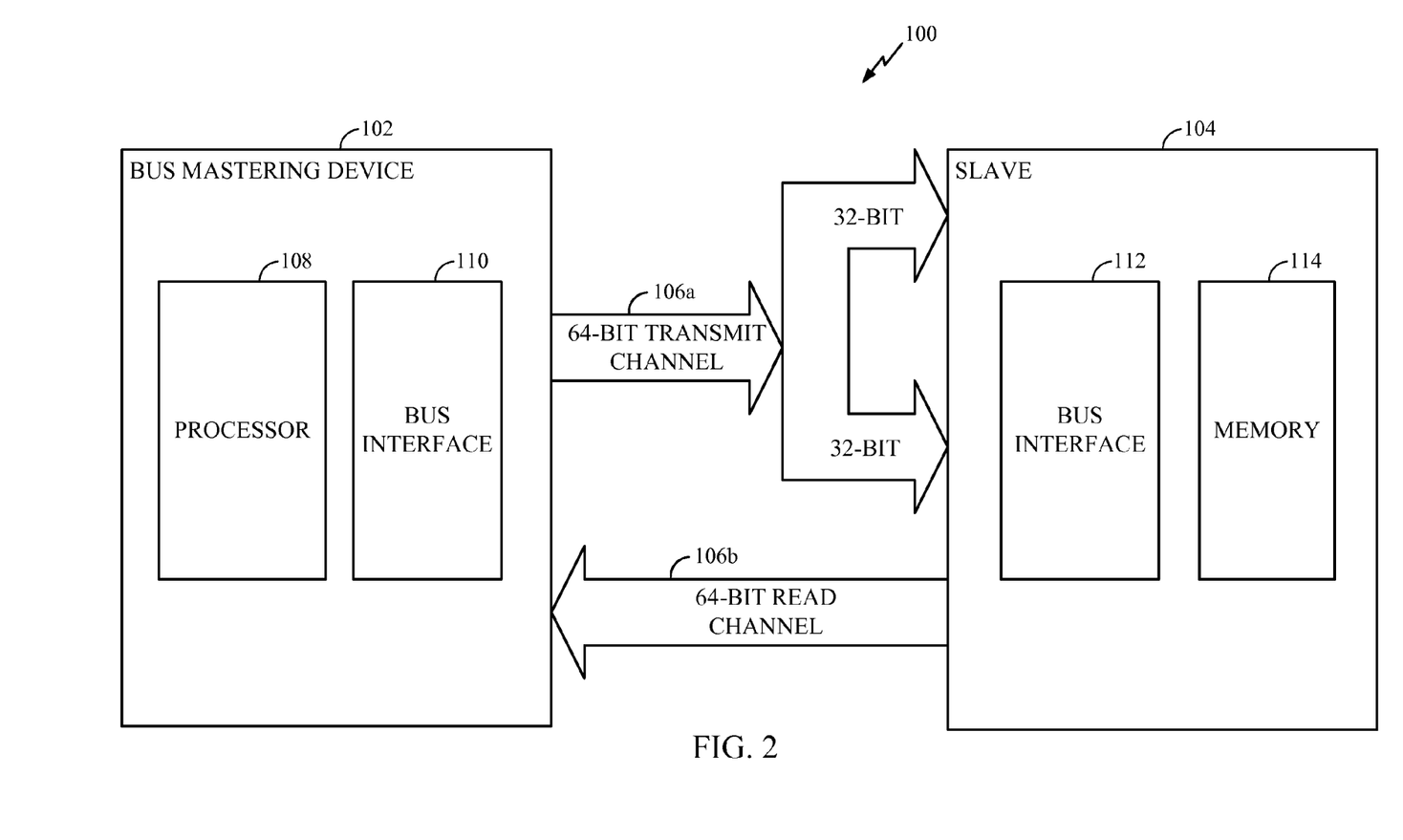
FIG. 2 is a conceptual block diagram illustrating an example of an addressing scheme used over a two channel bus in a processing system.

When the bus mastering device 102 presents two different addresses to the slave device 104, one for a read operation and one for a write operation, there is no need to coordinate the transmission sequence of the data. The write data may be sent over the transmit channel 106a at the same time the read data is sent over the read channel 106b. However, when the bus mastering device 102 presents two different addresses to the slave device 104 for two read operations or two write operations, the transmission sequence of the data may need to be coordinated. In one embodiment of the processing system 100, an addressing scheme may be used. By way of example, the data for the read or write operation associated with address transmitted on the lower-order byte lanes of the transmit channel 106a may be transmitted ahead of the data for the read or write operation associated with the address transmitted over the higher-order byte lanes of the transmit channel 106a. Alternatively, signaling between the bus mastering device 102 and slave device 104 may be used to determine the transmission sequence of the data.

The transmission sequence may also need to be coordinated when the bus mastering device 102 requests a read and write operation to the same address. By way of example, the bus mastering device 102 may need to read the data at the address in the slave device 104 before it is overwritten with new data. Alternatively, the bus mastering device 102 may need the new data, and therefore, will require that the new data be written to the address in the slave device 104 before being read out. An addressing scheme similar to the one discussed above may be used to coordinate access to the slave device 104. When a single bus transaction calls for a read and write operation to the same address, the request (i.e., read or write request) associated with the address transmitted on the lower-order byte lanes of the transmit channel 106a will be performed before the request associated with the same address transmitted on the higher-order byte lanes of the transmit channel 106a.

Figure 3:
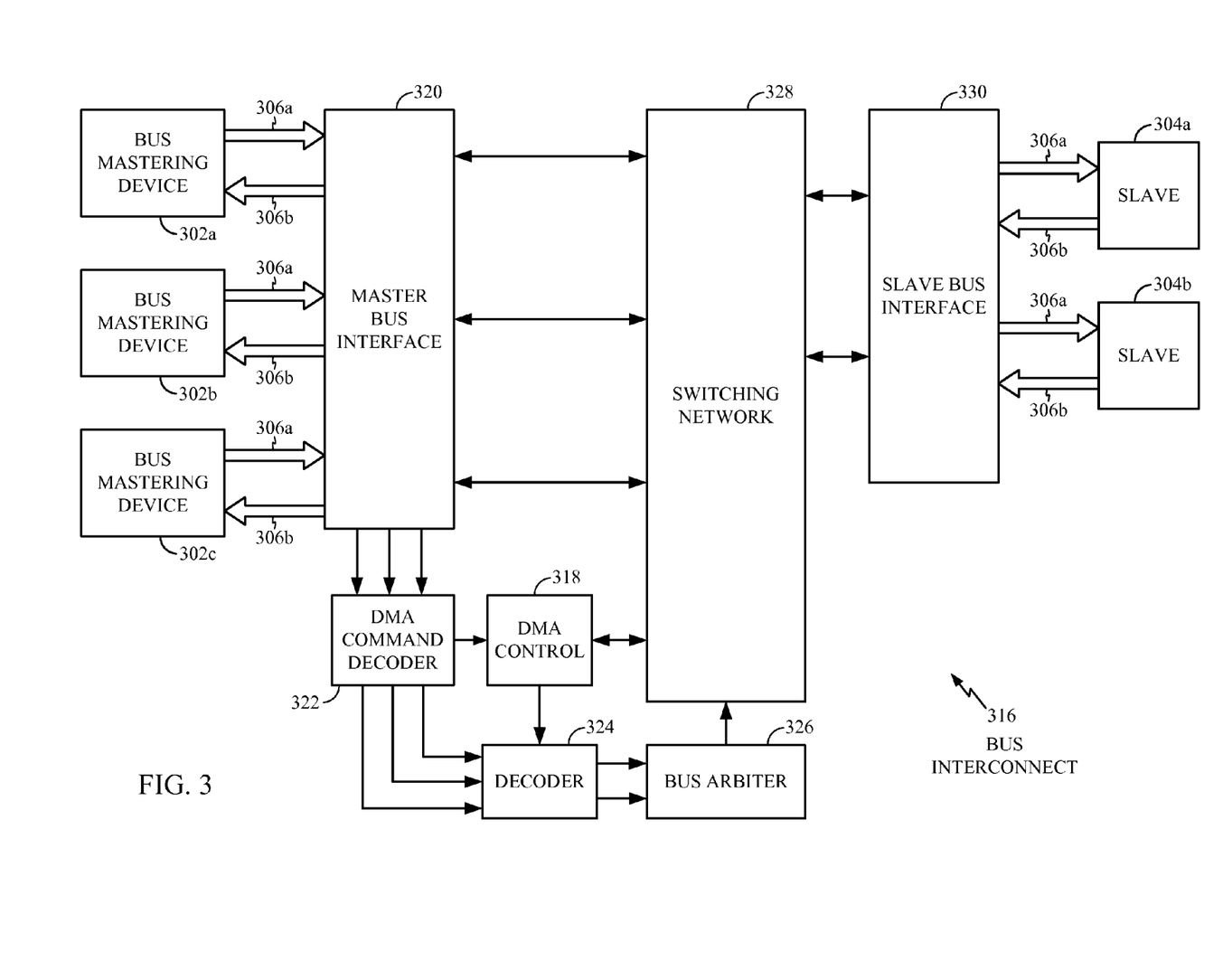
FIG. 3 is a conceptual block diagram illustrating an example of the processing system with a bus interconnect having DMA circuitry.

FIG. 3 is a conceptual block diagram illustrating an example of the processing system with a bus interconnect having DMA circuitry. In FIG. 3, the processing system 100 has been expanded to include three bus mastering devices 302a-302c connected to two slave devices 304a-304b over a two channel bus 306. A bus interconnect 316 is used to enable the bus mastering devices 302a-302c to access each of the slave devices 304a-304b.

The bus interconnect 316 includes a DMA controller 318 which enables a bus mastering device to transfer data between two address locations. By way of example, a bus mastering device may issue a bus command to transfer data from a source address in one slave device to a destination address in the same or another slave device. The bus command includes an asserted DMA data transfer attribute, the source and destination addresses, and the payload size.

The bus interconnect 316 also includes a master bus interface 320 that accepts bus commands (i.e., addresses, control signals, and write data) on the transmit channel 306a from the three bus mastering devices 302a-302b. The master bus interface 320 also provides read data to the bus mastering devices 302a-302c on the read channel 306b. The bus commands from the bus mastering devices 302a-302c are provided by the master bus interface 320 to a DMA command decoder 322. The DMA command decoder 322 determines whether each bus command is a request to transfer data between two address locations in one or more slave devices. The DMA command decoder 322 makes this determination based on the state of the DMA data transfer attribute for each bus command.

When the DMA data transfer attribute is deasserted, the DMA command decoder 322 determines that the bus mastering device is making a request to read from or write to a slave device. In that case, the DMA command controller 322 forwards the address for the corresponding bus command to the address decoder 324. The address decoder 324 determines the slave device for the address and makes a request to a bus arbiter 326 for access. The bus arbiter 326 manages access to the slave devices 304a-304b through a switching network 328. The switching network 328 provides direct links for the bus mastering devices 302a-302c to access the individual slave devices 304a-304b via a slave bus interface 330.

When the DMA data transfer attribute is asserted, the addresses for the corresponding bus command, which includes the source and destination addresses, is forwarded by the DMA command decoder 322 to the DMA controller 318. The DMA controller 318 provides the source address to the address decoder 324 as a read request. The address decoder 324 determines the slave device for the source address and makes a request to the bus arbiter 326 for access. The bus arbiter 326 determines the sequence of the read operations requested by the bus mastering devices 302a-302c and the DMA controller 318 by dynamically reconfiguring the switching network 328. The bus arbiter 326 signals the DMA controller 318 when the bus arbiter 326 has granted the DMA controller 318 access to the slave device for the source address. Once access has been granted, the DMA controller 318 reads the data from the source address in the slave device into an internal data buffer (not shown).

Next, the DMA controller 318 provides the destination address to the address decoder 324 as a write request. The address decoder 324 determines the slave device for the destination address and makes a request to the bus arbiter 326 for access. The bus arbiter 326 arbitrates the bus request with other pending read and write requests from the bus mastering devices 302a-302c. The bus arbiter 326 grants the DMA controller 318 access to the slave device for the destination address by reconfiguring the switching network 328 and signaling the DMA controller 318. The DMA controller then writes the data from its internal data buffer (not shown) into the slave device at the destination address.

The timing of the read and write requests by the DMA controller 318 may vary depending on the particular application and overall design constraints. As described above, the DMA controller 318 may issue a write request after it receives the data from the source address in a slave device. Alternatively, the DMA controller 318 may not wait until all the data is transferred from the source address and issue a write request when it first begins receiving the data. This later approach may enable the DMA controller 318 to read data from the source address and write the data to the destination address in a substantially parallel manner, skewed by a couple of clock cycles. In addition, the DMA controller 318 may be further configured to generate multiple read and write requests on its own when the size of the payload for the data transfer exceeds the maximum number of bytes that the processing system can support in response to a bus command.

Figure 4:
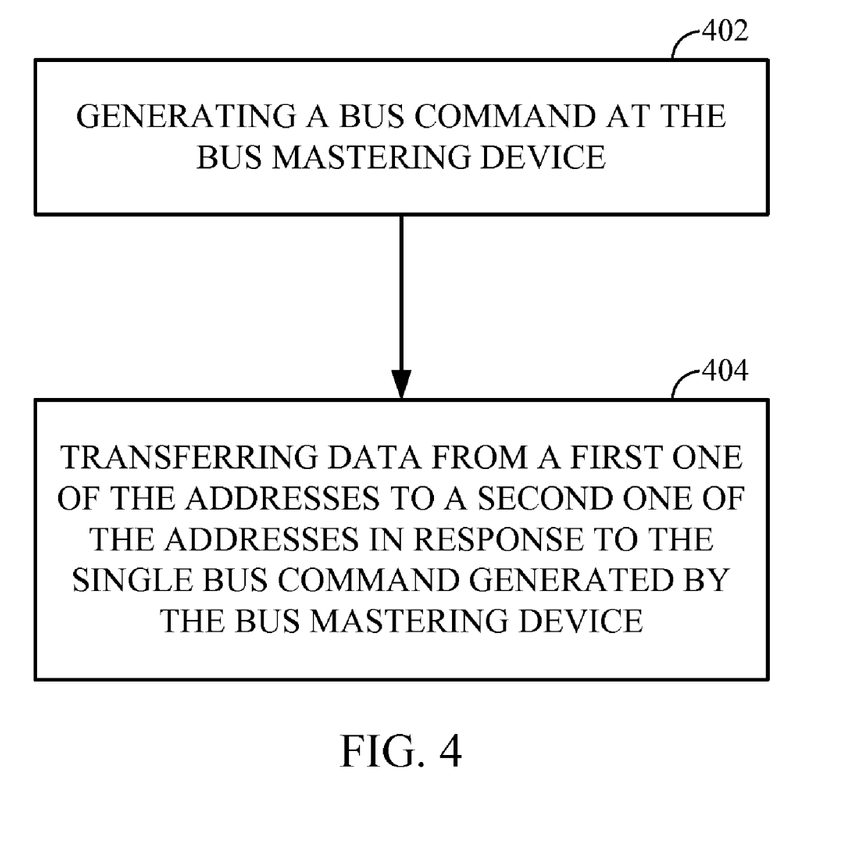
FIG. 4 is a flow chart illustrating an example of a method of transferring data in a processing system.

FIG. 4 is a flow chart illustrating an example of a method of transferring data in a processing system. The processing system includes a bus mastering device and a plurality of slave devices, each of the slave devices having a plurality of addresses. The method includes step 402, wherein a bus is generated at the bus mastering device. In step 404, data is transferred from a first one of the addresses to a second one of the addresses in response to the single bus command generated by the bus mastering device.

The transfer of data in step 404 may be performed by reading the data from the first one of the addresses into a bus interconnect and writing the data from the bus interconnect to the second one of the addresses. The first one of the addresses may be in a first one of the slave devices and the second one of the addresses may be in a second one of the slave devices. Alternatively, the first one of the addresses and the second one of the addresses may be in the same slave device.

The bus command generated in step 402 may include an asserted DMA data transfer attribute, and the first one of the addresses and the second one of the addresses. The first one of the addresses and the second one of the addresses may be transmitted simultaneously on a first channel of a two channel bus. The first channel may include first and second portions. The first portion may include one or more byte lanes and the second portion may include one or more different byte lanes. In one embodiment, the first one of the addresses is transmitted on the first portion of the first channel and the second one of the addresses is transmitted on the second portion of the first channel.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A processing system, comprising:
    a bus mastering device;
    a plurality of slave devices, each of the slave devices having a plurality of addresses; and
    a bus interconnect comprising a DMA controller configured to transfer data from a first one of the addresses to a second one of the addresses in response to a single bus command received in the DMA controller from the bus mastering device, wherein the single bus command includes the first one of the addresses, the second one of the addresses, and a payload size.

2. The processing system of claim 1 wherein the DMA controller is configured to transfer data from the first one of the addresses to a second one of the addresses by reading the data from the first one of the addresses into the bus interconnect and writing the data from the bus interconnect to the second one of the addresses.

3. The processing system of claim 1 wherein the bus command includes an asserted DMA data transfer attribute to request a transfer of data from the first one of the addresses to the second one of the addresses.

4. The processing system of claim 1 wherein the first one of the addresses is in a first one of the slave devices and the second one of the addresses is in a second one of the slave devices.

5. The processing system of claim 1 wherein the first one of the addresses and the second one of the addresses is in the same slave device.

6. The processing system of claim 1 further comprising a bus having first and second channels, the bus mastering device being further configured to use the first channel to send addresses and write data to the slave devices and use the second channel to receive read data from the slave devices, the bus mastering device being further configured to use the first channel to send the first one of the addresses and the second one of the addresses to the bus interconnect.

7. The processing system of claim 6 wherein the bus interconnect is further configured to identify the first one of the addresses and the second one of the addresses from the position of each on the first channel.

8. The processing system of claim 7 wherein the first channel includes first and second portions, the first portion including one or more byte lanes and the second portion including one or more different byte lanes, and wherein the bus interconnect is further configured to look for the first one of the addresses on the first portion of the first channel and the second one of the addresses on the second portion of the first channel.

9. A bus mastering device, comprising:
    a processor configured to access a plurality of slave devices through a bus interconnect, each of the slave devices having a plurality of addresses, the processor being further configured to send a single bus command to the bus interconnect, the bus command being sufficient to enable the bus interconnect to transfer data from a first one of the addresses to a second one of the addresses and the bus command includes the first one of the addresses, the second one of the addresses, and a payload size.

10. The bus mastering device of claim 9 wherein the bus command includes an asserted DMA data transfer attribute to request a transfer of data from the first one of the addresses to the second one of the addresses, the processor being further configured to deassert the DMA data transfer attribute and access the slave devices with the DMA data transfer attribute deasserted.

11. The bus mastering device of claim 9 wherein the first one of the addresses is in a first one of the slave devices and the second one of the addresses is in a second one of the slave devices.

12. The bus mastering device of claim 9 wherein the first one of the addresses and the second one of the addresses is in the same slave device.

13. The bus mastering device of claim 9 further comprising a bus interface configured to interface the processor to a bus having first and second channels, the bus interface being configured to use the first channel to send addresses and write data to the slave devices and use the second channel to receive read data from the slave devices, and wherein the bus interface is further configured to simultaneously send the first one of the addresses and the second one of the addresses to the bus interconnect on the first channel.

14. The bus mastering device of claim 13 wherein the first channel includes first and second portions, the first portion including one or more byte lanes and the second portion including one or more different byte lanes, and wherein the bus interface is further configured to use the first portion of the first channel to send the first one of the addresses and the second portion of the first channel to send the second one of the addresses.

15. A bus interconnect configured to support communications between a bus mastering device and a plurality of slave devices, each of the slave devices having a plurality of addresses, the bus interconnect comprising:
    a DMA controller configured to transfer data from a first one of the addresses to the second one of the addresses in response to a single bus command from the bus mastering device, the bus command includes the first one of the addresses, the second one of the addresses, and a payload size.

16. The bus interconnect of claim 15 wherein the DMA controller is configured to transfer data from the first one of the addresses to the second one of the addresses by reading the data from the first one of the addresses into the bus interconnect and writing the data from the bus interconnect in the second one of the addresses.

17. The bus interconnect of claim 15 wherein the first one of the addresses is in a first one of the slave devices and the second one of the addresses is in a second one of the slave devices.

18. The bus interconnect of claim 15 wherein the first one of the addresses and the second one of the addresses is in the same slave device.

19. The bus interconnect of claim 15 further comprising a bus interface configured to interface the switching network to a bus having first and second channels, the bus interface being further configured to receive addresses and write data from the bus mastering device on the first channel, and to send read data to the bus mastering device on the second channel, and wherein the bus interface is further configured to simultaneously receive the first one of the addresses and the second one of the addresses from the bus mastering device on the first channel.

20. The bus interconnect of claim 19 wherein the bus interface is further configured to identify the first one of the addresses and the second one of the addresses from the position of each on the first channel.

21. The bus interconnect of claim 20 wherein the first channel includes first and second portions, the first portion including one or more byte lanes and the second portion including one or more different byte lanes, and wherein the bus interface is further configured to look for the first one of the addresses on the first portion of the first channel and the second one of the addresses on the second portion of the first channel.

22. A method of transferring data in processing system having a bus mastering device and a plurality of slave devices, each of the slave devices having a plurality of addresses, the method comprising:
    generating a bus command at the bus mastering device, the bus command includes a first one of the addresses, a second one of the addresses, and a payload size; and
    transferring data from the first one of the addresses to the second one of the addresses in response to the single bus command generated by the bus mastering device.

23. The method of claim 22 wherein the transfer of data comprises reading the data from the first one of the addresses into a bus interconnect and writing the data from the bus interconnect to the second one of the addresses.

24. The method of claim 22 wherein the bus command includes an asserted DMA data transfer attribute.

25. The method of claim 22 wherein the first one of the addresses is in a first one of the slave devices and the second one of the addresses is in a second one of the slave devices.

26. The method of claim 22 wherein the first one of the addresses and the second one of the addresses is in the same slave device.

27. The method of claim 22 wherein the processing system further comprises a bus having first and second channels, the method further comprising accessing the slave devices using the first channel to transmit addresses and write data and using the second channel to transmit read data, and wherein the bus command includes the first one of the addresses and the second one of the addresses transmitted simultaneously on the first channel.

28. The method of claim 27 wherein the first channel includes first and second portions, the first portion including one or more byte lanes and the second portion including one or more different byte lanes, and wherein the first one of the addresses is transmitted on the first portion of the first channel and the second one of the addresses is transmitted on the second portion of the first channel.

29. A bus mastering device, comprising:
    means for accessing a plurality of slave devices through a bus interconnect, each of the slave devices having a plurality of addresses; and
    means for sending a single bus command to the bus interconnect, the bus command being sufficient to enable the bus interconnect to transfer data from a first one of the addresses to a second one of the addresses and the bus command includes the first one of the addresses, the second one of the addresses, and a payload size.

30. A bus interconnect, comprising:
    means for switching a bus mastering device between a plurality of slave devices, each of the slave devices having a plurality of addresses; and
    means for transferring data from a first one of the addresses to a second one of the addresses in response to a single bus command from the bus mastering device, the bus command includes the first one of the addresses, the second one of the addresses, and a payload size.

* * * * *

UNITED STATES PATENT AND TRADEMARK OFFICE
CERTIFICATE OF CORRECTION

| | | Page 1 of 1 |
|---|---|---|
| PATENT NO. | : 7,822,903 B2 | |
| APPLICATION NO. | : 11/557119 | |
| DATED | : October 26, 2010 | |
| INVENTOR(S) | : Hofmann et al. | |

It is certified that error appears in the above-identified patent and that said Letters Patent is hereby corrected as shown below:

Column 7, line 58, claim 5: "is in" to read as --are in--

Column 8, line 35, claim 12: "is in" to read as --are in--

Column 8, line 59, claim 15: "the second" to read as --a second--

Column 9, line 8, claim 18: "is in" to read as --are in--

Column 9, line 11, claim 19: "the switching network" to read as --a switching network--

Column 10, line 7, claim 26: "is in" to read as --are in--

Signed and Sealed this
Thirtieth Day of August, 2011

David J. Kappos
*Director of the United States Patent and Trademark Office*